Patented Apr. 2, 1940

2,196,110

UNITED STATES PATENT OFFICE

2,196,110

PROCESS OF PRODUCING SOUND FILMS

John Eggert, Leipzig, and Alfred Küster, Dessau-Haideburg, Germany, assignors to I. G. Farbenindustrie Aktiengesellschaft, Frankfort-on-the-Main, Germany No Drawing. Application May 25, 1938, Serial No. 209,996. In Germany June 14, 1937

3 Claims. (Cl. 95—5)

This invention relates to a process of producing sound films and more particularly such films having sound tracks which are obtained by a reversal development with a controlled second exposure.

It is known that owing to the varying conditions of photography the picture area of a film shows marked variations and is often faultily exposed to a considerable degree. In the sound track, however, which is generally exposed by a constant source of light such faulty exposure can readily be avoided. The sound track and pictures on one and the same film may therefore show considerable differences in the length of the second exposure required in the reversal development. When the sound film is produced by a negative-positive process the faulty exposures can be compensated for, for example by regulating the copying light, but such a method is out of the question when the sound films are developed by a reversal process. It is, however, known in this kind of process to compensate for faulty exposures by a controlled second exposure; thus if the sound track and picture field of a sound film are subjected to separate exposures of different intensity it is possible to compensate for faulty exposure. Such a process, however, is highly inconvenient, especially if the second exposure is automatic, since it requires a separate apparatus for the picture field and the sound track.

It is an object of this invention to provide a process which by reason of the fact that the sound track especially in the case of variable area sound tracks, is in general less sensitive to variations of exposure than is the picture area, considerably simplifies the second exposure by controlling the second exposure light in common for both the picture area and sound track irrespective of the sound track in dependence on the density of the picture.

Another object of this invention is to provide a process in which the density of the picture of the sound film is measured photoelectrically for example after the first development or after the removal of the developed silver and the second exposure of the film (sound track and picture area) is then controlled for example automatically. The control can naturally also be manual by virtue of a visual estimate of the picture density.

Further objects of this invention are set forth in the following description.

In many cases it may also be desirable to compensate for the variation in the blackening of the sound track caused by the variation of the second exposure. This can be carried out by giving the sound track after the second exposure a red or infra-red exposure which can be controlled by the same photocell as controlled the second exposure. The stronger the second exposure, the stronger should be the red exposure. The red exposure reduces the effect of the previous exposure (Herrschel effect) and by correctly choosing the ratio between the intensities of the red exposure and the second exposure the blackening of the sound track can be kept constant.

We claim:

1. In a process of producing films having a picture record and a sound record by reversal development with a controlled second exposure, the step which comprises controlling the second exposure of both the picture area and the sound track in dependence on the density of said picture area and exposing said sound track after said second exposure to a light which reduces the effect of said second exposure and of which the intensity can be controlled in dependence on the density of said picture area.

2. In a process of producing films having a picture record and a sound record by reversal development with a controlled second exposure, the step which comprises controlling the second exposure of both the picture area and the sound track in dependence on the density of said picture area and exposing said sound track after said second exposure to red light of which the intensity can be controlled in dependence on the density of said picture area.

3. In a process of producing films having a picture record and a sound record by reversal development with a controlled second exposure, the step which comprises controlling the second exposure of both the picture area and the sound track in dependence on the density of said picture area and exposing said sound track after said second exposure to infra-red light of which the intensity can be controlled in dependence on the density of said picture area.

JOHN EGGERT.
ALFRED KÜSTER.